June 29, 1926.
H. E. ALTGELT
WHEELED CULTIVATOR
Filed March 25, 1925 4 Sheets-Sheet 1
1,590,664
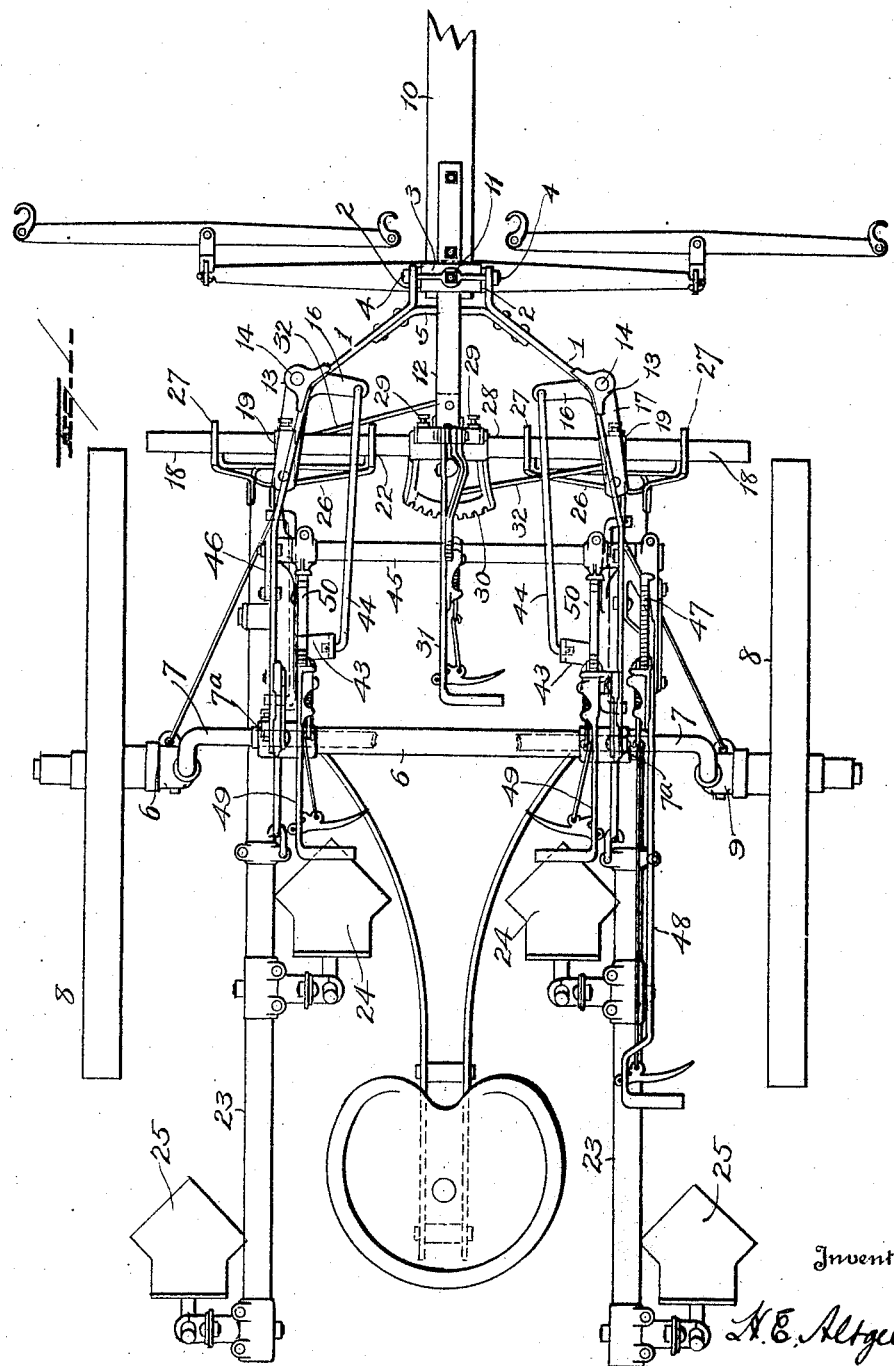
Inventor
H. E. Altgelt
By
Seymour & Bright
Attorneys

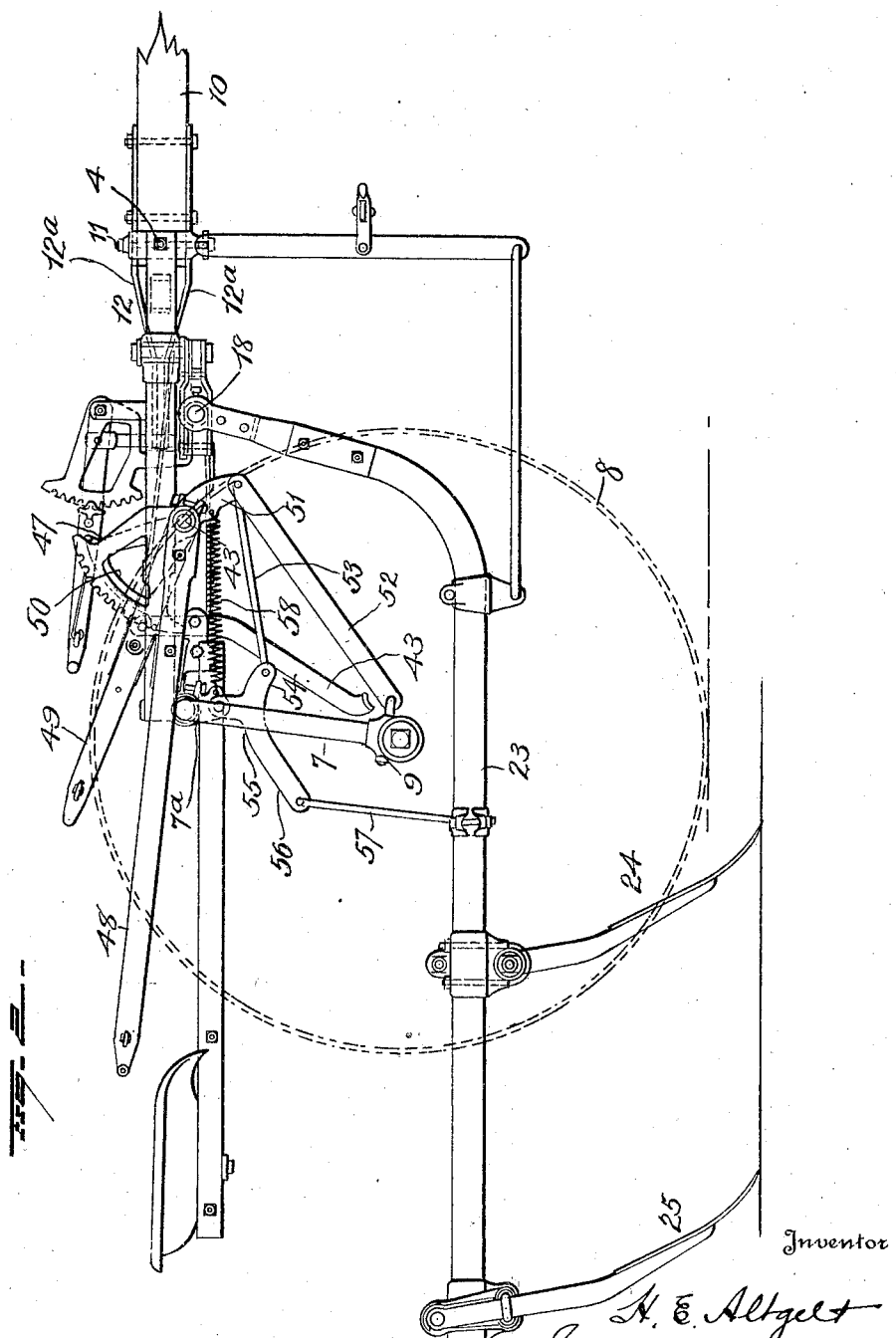

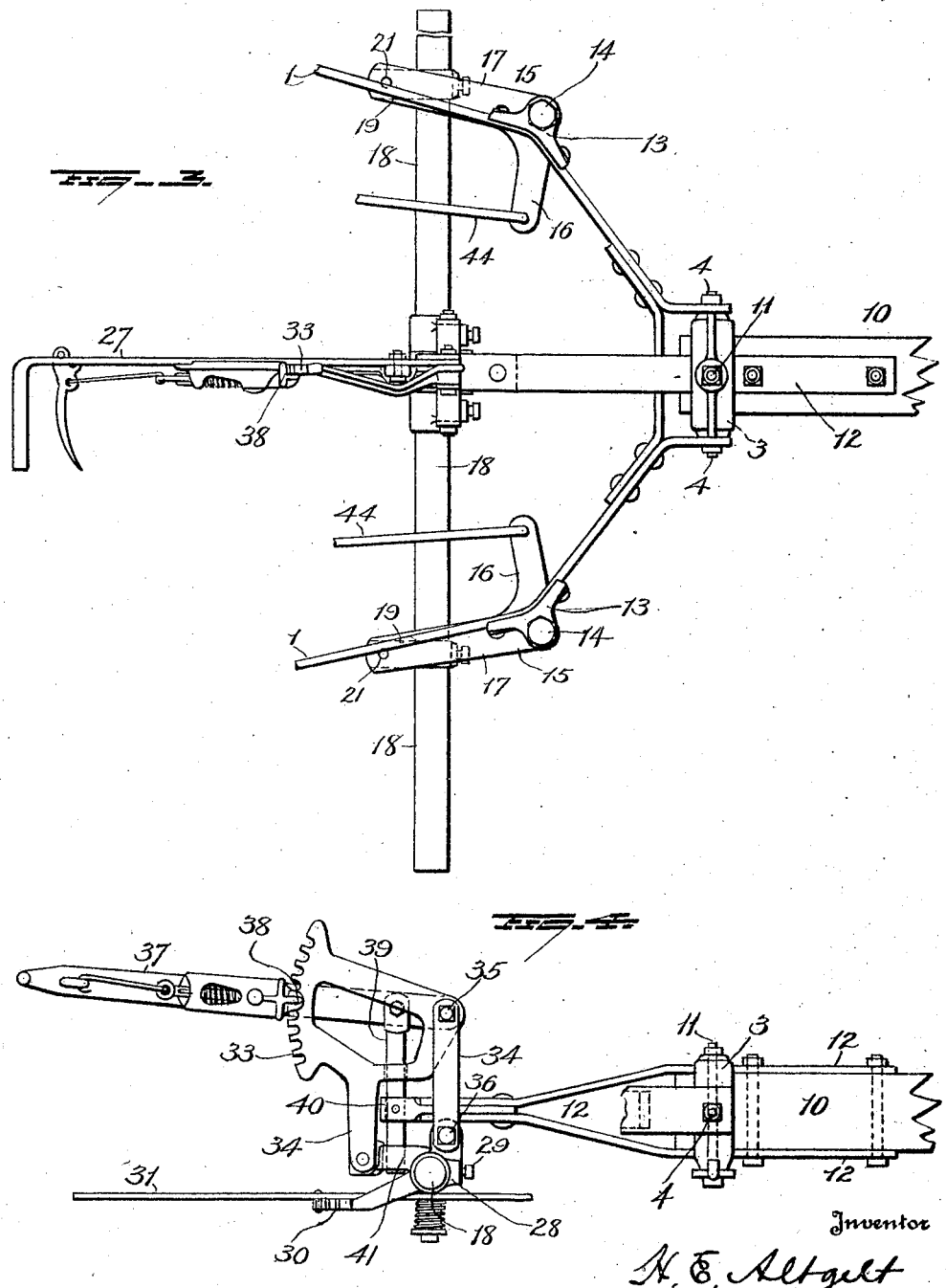

June 29, 1926.
H. E. ALTGELT
WHEELED CULTIVATOR
Filed March 25, 1925    4 Sheets-Sheet 4
1,590,664
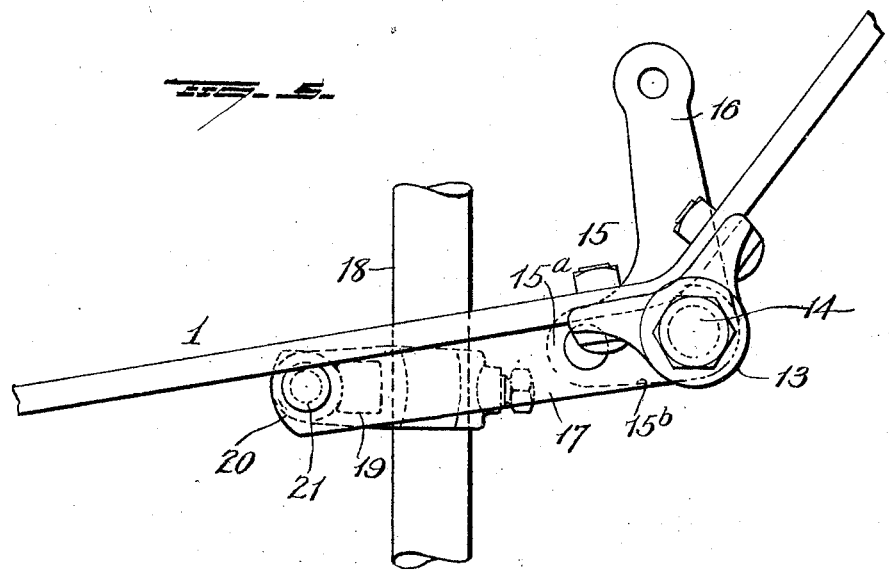
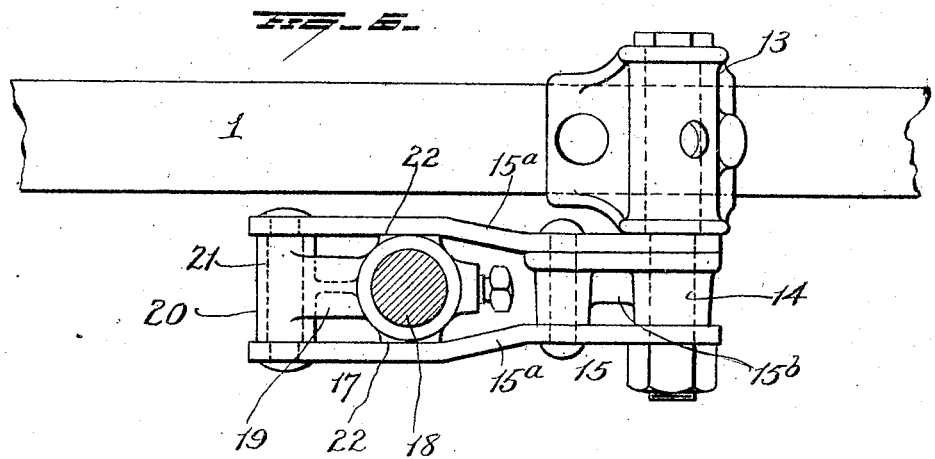
Inventor
H. E. Altgelt
By Seymour & Bright
Attorneys Patented June 29, 1926.

1,590,664

UNITED STATES PATENT OFFICE.

HERMAN E. ALTGELT, OF SOUTH BEND, INDIANA, ASSIGNOR TO OLIVER CHILLED PLOW WORKS, OF SOUTH BEND, INDIANA.

WHEELED CULTIVATOR.

Application filed March 25, 1925. Serial No. 18,240.

This invention relates to improvements in wheeled cultivators,—objects of the invention being to provide simple and efficient means which shall be operable to shift the cultivator gangs sidewise and steering the cultivator; to provide means for tilting the pole vertically and effecting adjustment of the working depths of the forward and rear shovels relatively to each other, and to provide improved means for effecting raising and lowering of the cultivator gangs.

With these and other objects in view, the invention consists in certain novel features of construction and combinations of parts as hereinafter set forth and pointed out in the claims.

In the accompanying drawings:—

Figure 1 is a plan view of a cultivator embodying my improvements;

Figure 2 is a view in side elevation;

Figure 3 is a plan view illustrating the pole tilting and shovel adjusting devices;

Figure 4 is a side view of mechanism shown in Figure 3, and

Figures 5 and 6 are enlarged detail views.

The frame of the cultivator is indicated at 1 and the forward portions of said frame are made convergent and formed with short parallel arms 2, between which a hollow casting 3 is supported on horizontal bolts 4. The forward portions of the frame bars are connected, in rear of the arms 2, by a brace 5. The rear cross bar 6 of the frame may be made tubular and provides a mounting for a crank axle 7 for the accommodation of carrying wheels 8,—sand bands 9 being secured to the cranks of the axle adjacent to the wheel hubs.

The rear end of a pole 10 enters the hollow casting 3 at the forward end of the frame 1 and is pivotally connected thereto by a vertical pivot bolt 11 so that said pole may have a horizontal movement,—the forward end of the pole being connected with the neck yokes on the draft animals, and therefore the front end of the pole will remain almost in a fixed position laterally with respect to the row that is being cultivated. A rearward extension 12 is rigidly secured to the pole 10 and may comprise two members $12^a$ secured to the upper and lower faces respectively of the pole,—the rear end of said extension being connected with operating means as hereinafter described.

Secured to the forward portion of the frame 1, at respective sides of the same, are brackets 13 which provide bearings for the pivot pins 14 of bell-crank levers 15, each of which latter comprises two spaced members $15^a$ and a bracing and spacing member $15^b$. The arm 16 of each bell-crank is shorter than the arm 17 thereof, and the members of each arm 17 is connected with a transverse bar 18 through the medium of a block 19. Each block 19 is secured on the bar 18 and projects rearwardly therefrom, the rear end portion of said block forming a sleeve 20 disposed between the free end portions of the members of the arm 17 of the bell-crank and pivotally connected with said arm by means of a pin 21. The block 19 is made with flat faces 22, against which the members of bell-crank arm 17 have sliding movement. It will be observed that the transverse bar 18 is nearer the pivot bearings of the bell-cranks than are the pivot connections of the bell-crank at 21, with said bar through the medium of the blocks 19.

It will be observed that the transverse bar 18 is carried by the longer arms of the two bell-cranks 15 so that it is movable with the latter, and with said transverse bar, the forward ends of the beams of cultivator or shovel gangs 23 are connected, said gangs including forward shovels 24 and rear shovels 25. In effecting the connection between the cultivator gang beams and the transverse bar, brackets 26 are employed, each of said brackets comprising two members having spaced bearings 27 movable on said bar 18. To the central portion of the bar 18, a bracket 28 is secured (preferably by means of set screws 29), and this bracket carries a horizontally disposed toothed segment 30, the latter being shown in the present instance, as an integral part of said bracket. A hand lever 31 is pivotally mounted on the bracket 28 and carries a detent to engage the segment 30, and rods 32 connect said lever 31 (at respective sides of the pivotal mounting thereof) with the respective cultivator gang brackets 26. Normally, the brackets 26 and hence the cultivator gangs, will be locked against lateral movement relatively to the transverse bar 18 by the locking of the hand lever 31 to the segment 30, but this lever may, when released from the segment, to shift the brackets 22 relatively to said transverse bar, and thus space the cultivator gangs a greater or less distance apart.

A vertically disposed segment 33 is supported by the bracket 28, said segment having a depending arm 34 secured to the rear portion of said bracket and the forward portion of the segment is connected with the forward portion of the bracket 28 by means of vertical links 34,—the latter being connected with the segment 33 by means of a bolt 35 and with the bracket 28 by means of a bolt 36. A hand lever 37 has a pivotal mounting on the bolt 35 and carries a detent 38 to engage the segment 33. A pin 39 is pivotally connected at its upper end to the lever 37 and passes freely through a guide 40 in the frame of segment 33 and through a guide hole 41 in the bracket 28. To the pin 39, the rear end of the pole extension 12 is secured, as clearly shown in Figure 4.

Hung from the frame 1 are two foot levers 43, 43, and these are connected by rods 44, 44, with the inwardly projecting shorter arms 16 of the bell-crank-levers 15. When one of the foot levers is operated, the bar 18 will, through the medium of one of the bell-crank-levers 15, be caused to move sidewise in one direction, the other foot lever and bell-crank lever moving idly, and when such other foot lever is positively operated, the bar 18 will be moved sidewise in the other direction. Since the cultivator gang beams are connected with the said bar 18, said beams will be shifted laterally when the bar is moved side-wise, and the pole (connected with said bar through the medium of the pole extension and intermediate devices) will be caused to swing laterally on the vertical pivot bolt 11, the front end of the pole being connected with the neck yokes of the draft animals. Thus the cultivator gangs and the cultivator steered, by means of foot levers acting through bell-crank-levers, to shift the bar with which the cultivator gangs are connected and to swing the pole horizontally on a vertical pivot bolt.

It will be observed that the pivot bolts 4 and 11 and hollow casting 3 provide a universal connection between the pole 10 and the frame and that the pole may be tilted vertically as well as shifted horizontally. By operation of the hand lever 37, vertical movement will be imparted to the pin 39 (Figs. 2 and 4) and the pole extension 12 connected with said pin will be moved vertically, thus tilting the pole on the pivot bolts 4. When the pole is thus tilted the cultivator beams will be so raised or lowered that the rear shovels will be raised or lowered relatively to the forward shovels without the necessity for loosening and tightening bolts. By raising the pole tilting lever 37 the forward shovels will be caused to plow shallower in relation to the rear shovels 25, and by lowering the tilting lever 37, the forward shovels are caused to plow deeper in relation to the rear shovels. It will be remembered that the forward end of the pole is connected with the neck yokes of the draft animals, and such connection must be considered as a substantially fixed point.

A transverse shaft 45 is mounted in a bearing bracket 46 at one side of the frame 1 and in a bearing afforded by a segment bracket 47 secured to the other side of the frame, and to this shaft, a hand lever 48 is secured,—said hand lever being provided with a suitable detent to engage the teeth of said segment. Smaller hand levers 49 are loosely mounted on the shaft 45 at respective sides of the frame and carry suitable detents to engage toothed segments 50. The short levers 49 are provided with depending arms 51 and these are connected, by bars 52 with the sand bands 9, and therefore with the cranks of the axle. Rods 53 are also connected with the lever arms 51 coincident with the pivotal connection thereto of the bars 52 and the rear ends of these arms are connected with the short arms 54 of bell-crank-levers 55 pivotally supported under the frame. In the drawings the bell-cranks 55 are shown as connected with the axle brackets 7ª. The longer rear arms 56 of the bell-crank-levers 55 are connected by rods 57, and a lifting spring 58 is connected at one end to the short arm 51 of each lever 49 and at their rear ends these springs are connected with the frame, through the medium of the axle brackets 7ª.

With the construction and arrangement of lifting mechanism above described, both cultivator gangs may be raised and the wheels moved backwardly by raising the main lever 48, and the lowering of said lever will effect the lowering of the two gangs and the forward movement of the wheels. By manipulation of either of the auxiliary levers 49, one of the gangs may be raised or lowered independently of the other and one of the wheels moved backwardly or forwardly. It will also be seen that when the main lever 48 is operated both springs 58 will be brought into action but that when one of the levers 59 is manipulated, only one of the springs will be brought into action.

Various changes might be made in the details of construction of my invention without departing from the spirit of the latter or limiting its scope and hence I do not wish to restrict myself to the precise details herein set forth.

Having fully described my invention what I claim as new and desire to secure by Letters-Patent, is:—

1. In a wheeled cultivator, the combination with a frame and a pole pivotally connected therewith, of a transverse movable bar, bell-crank-levers mounted on the frame in advance of said bar, blocks secured to said bar and projecting rearwardly therefrom, pivotal connections between said blocks and rearwardly projecting arms of said bell-crank levers, a rearward extension on the pole, means pivotally connecting said rearward extension with said bar, cultivator gang beams attached to said bar, and operating means connected with arms of said bell-crank-levers.

2. In a wheeled cultivator, the combination with a frame and a pole pivotally connected therewith, of a transverse movable bar, bell-crank-levers mounted on the frame in advance of said bar, blocks secured to said bar and projecting rearwardly therefrom, pivotal connections between said blocks and rearwardly projecting arms of said bell-crank-levers, a rearward extension on the pole, means pivotally connecting said rearward extension with said bar, cultivator gang beams attached to said bar, and operating means connected with arms of said bell-crank-levers, each of said bell-crank-levers comprising two spaced members, and said blocks disposed between the members of one arm of the respective bell-crank-levers and having rubbing faces for said arm members.

3. In a wheeled cultivator, the combination with a frame and a pole pivotally connected therewith and provided with a rearward extension, of bell-crank-levers mounted on the frame, a transverse bar having pivotal connection with one arm of each of said levers, a bracket secured to said bar, a pin supported by said bracket and having connection with the rearward extension of the pole, cultivator gang beams, brackets secured to said beams and having laterally movable mounting on said bar, levers connected with the respective brackets for moving them relatively to each other, a segment for locking said lever, and means for operating said bell-crank-levers.

4. In a wheeled cultivator, the combination with a frame, a hollow casting at the forward end thereof, a pole entering said hollow casting and having a rearward extension, and vertical and horizontal pivots for said pole, of a bar capable of being moved laterally relatively to the frame, means for movably supporting said bar, means pivotally connecting said bar with the rearward extension of the pole, cultivator gang beams connected with said bar, means for moving said bar laterally of the frame and means carried by said bar for effecting vertical pivotal movement of the pole to adjust the cultivator gangs.

5. In a wheeled cultivator, the combination with a frame, a pole having horizontal and vertical pivotal connection with the frame, said pole having a rearward extension, of a bar movable laterally with respect to the frame, means for movably supporting said bar, cultivator gang beams connected with said bar, a bracket secured to said bar, a vertical segment carried by said bracket, a hand lever pivoted to said segment and cooperable therewith, a vertical pin connected with said lever and cooperable with said bracket and connected with the rearward extension of the pole, and operating means for moving said bar laterally with respect to the frame.

6. In a wheeled cultivator, the combination with a frame, a pole having pivotal connection with the frame, and provided with a rearward extension, a transverse bar supported by the frame, cultivator gang beams connected with said bar, a bracket secured to the bar, a vertical segment supported by said bracket, a hand lever pivoted to said segment and carrying a detent for cooperation therewith, a pin connected with said lever and cooperable with said bracket, and means connecting said pin with the rearward extension of the pole.

In testimony whereof, I have signed this specification.

HERMAN E. ALTGELT.